United States Patent
Hoteit

(10) Patent No.: US 9,765,961 B2
(45) Date of Patent: Sep. 19, 2017

(54) CHEMICAL LOOPING COMBUSTION PROCESS WITH MULTIPLE FUEL REACTION ZONES AND GRAVITY FEED OF OXIDIZED PARTICLES

(71) Applicant: Saudi Arabian Oil Company, Dhahran (SA)

(72) Inventor: Ali Hoteit, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 409 days.

(21) Appl. No.: 14/660,477

(22) Filed: Mar. 17, 2015

(65) Prior Publication Data

US 2016/0273761 A1    Sep. 22, 2016

(51) Int. Cl.
*F23C 10/08* (2006.01)
*F23C 6/04* (2006.01)
(Continued)

(52) U.S. Cl.
CPC ............. *F23C 10/08* (2013.01); *F23C 6/042* (2013.01); *F23C 10/01* (2013.01); *F23C 10/10* (2013.01);
(Continued)

(58) Field of Classification Search
None
See application file for complete search history.

(56) References Cited

U.S. PATENT DOCUMENTS

| 2,665,971 A | 1/1954 | Lewis et al. |
| 4,797,262 A | 1/1989 | Dewitz |

(Continued)

FOREIGN PATENT DOCUMENTS

| EP | 2273192 A1 | 1/2011 |
| EP | 2610216 A1 | 7/2013 |

(Continued)

OTHER PUBLICATIONS

Lyngfelt, A., "Oxygen Carriers for Chemical Looping Combustion—4000 h of Operational Experience", Oil & Gas Science and Technology (2011), vol. 66, No. 2, pp. 161-172.
(Continued)

*Primary Examiner* — Gregory Huson
*Assistant Examiner* — Martha Becton
(74) *Attorney, Agent, or Firm* — Abelman, Frayne & Schwab

(57) ABSTRACT

An improved chemical looping combustion (CLC) process and system includes a hopper containing oxygen carrier particles, e.g., metal oxides, that are gravity fed at a controlled rate of flow from the hopper into (a) a generally vertical downflow reactor where they are mixed with all of the hydrocarbon fuel feed to the system and (b) into one or more standpipes that are in communication with a plurality of staged fluidized reactor beds, the amount of the oxygen carrier particles introduced into the system being stoichiometrically predetermined to produce a syngas mixture of $H_2$ and $CO_2$; or to complete combustion of the fuel to $CO_2$ and water vapor, thereby permitting capture of a majority of the $CO_2$ produced in an essentially pure form.

7 Claims, 3 Drawing Sheets

(51) Int. Cl.
*F23C 10/10* (2006.01)
*F23C 10/01* (2006.01)
*F23C 99/00* (2006.01)

(52) U.S. Cl.
CPC ............ *F23C 99/00* (2013.01); *F23C 99/005* (2013.01); *F23C 2900/99008* (2013.01); *Y02E 20/346* (2013.01)

(56) References Cited

U.S. PATENT DOCUMENTS

| | | |
|---|---|---|
| 7,419,648 B2 | 9/2008 | Kuipers et al. |
| 7,767,191 B2 | 8/2010 | Thomas et al. |
| 8,318,101 B2 | 11/2012 | Morin et al. |
| 8,356,992 B2 | 1/2013 | Jadhav |
| 8,486,361 B2 | 7/2013 | Bialkowski et al. |
| 8,561,556 B2 | 10/2013 | Morin et al. |
| 9,464,010 B2 * | 10/2016 | Naterer ............... C07C 1/12 |
| 9,683,737 B2 * | 6/2017 | Ryu ..................... F23C 99/00 |
| 2011/0048296 A1 | 3/2011 | Maghdissian et al. |
| 2011/0054049 A1 | 3/2011 | Lambert et al. |
| 2011/0171588 A1 | 7/2011 | Gauthier et al. |
| 2012/0214106 A1 | 8/2012 | Sit et al. |
| 2013/0149650 A1 * | 6/2013 | Gauthier ............... C10J 3/725 431/7 |
| 2014/0072917 A1 * | 3/2014 | Fan ....................... C01B 3/22 431/170 |
| 2014/0335461 A1 * | 11/2014 | Guillou ............. F23C 10/005 431/7 |
| 2015/0010873 A1 * | 1/2015 | Ryu ................... F23C 10/005 431/170 |
| 2015/0241056 A1 * | 8/2015 | Bollas ................ F23C 99/006 431/7 |
| 2016/0017799 A1 * | 1/2016 | Hoteit ..................... F02C 3/22 60/780 |
| 2016/0039724 A1 * | 2/2016 | Naterer ................. C07C 1/12 422/142 |
| 2016/0061442 A1 * | 3/2016 | Yazdanpanah ......... B01J 8/28 431/7 |
| 2016/0102255 A1 * | 4/2016 | Hoteit ................... C10G 9/36 208/126 |

FOREIGN PATENT DOCUMENTS

| | | |
|---|---|---|
| WO | 2012064712 A1 | 5/2012 |
| WO | 2013/104836 A1 | 7/2013 |

OTHER PUBLICATIONS

Hadley, T.D., "Pressure Balance of a Multiple-Loop Chemical Reactor", The 13th International Conference on Fluidization—New Paradigm in Fluidization Engineering (2010), Engineering Conferences International, Title page & pp. 1-9.

Cao, Y., "Application of a Circulating Fluidized Bed Process for the Chemical Looping of Combustion of Solid Fuels", Prepr. Pap.-Am. Chem. Soc., Div. Fuel Chem. (2014), 49(2), pp. 815-816.

* cited by examiner

CHEMICAL LOOPING COMBUSTION PROCESS WITH MULTIPLE FUEL REACTION ZONES AND GRAVITY FEED OF OXIDIZED PARTICLES

FIELD OF THE INVENTION

The present invention relates to the operation of chemical looping combustion processes with heavy liquid hydrocarbon fuel injection into a downflow reactor in direct contact with a solid oxygen transfer material, e.g., metal oxide particles.

BACKGROUND OF THE INVENTION

Carbon capture and storage (CCS) has been proposed and to some extent adopted as a mid- to long-term measure in the fight to mitigate the undesirable effects of global warming by reducing the emission of greenhouse gases. A significant element that has been missing, particularly in the field of stationary power plants, is a technically feasible and economically sound means for operating a carbon capture system. Several different techniques exist today that can be used to obtain $CO_2$ in a pure stream from a combustion unit. The three most often mentioned are post-treatment, $O_2/CO_2$ firing, or oxyfuel, and CO-shift.

One variety of petroleum is heavy oil. Like the so-called "bottom of the barrel" of conventional petroleum, heavy oil is quite carbon-rich and by definition very dense. It is estimated that heavy oil production will increase by 200 percent in 2030. Of the world's total oil reserves, an estimated 53 percent are in the form of heavy oil or bitumen, which terms are used interchangeably to describe oil that is highly viscous, solid or near-solid at room temperature, e.g., tar or asphalt, that has a relatively low hydrogen content and that also has a high mass density, e.g., an API gravity of 20 degrees or less. Vaporization of heavy liquid fuels is not always practical due to the composition and the physical characteristics of these fuels and vaporization of heavy fuel oil can require a complex feeding system that is more costly than a direct liquid fuel oil feeding system.

Refining heavy oil presents a technical challenge. However, as the price of lighter crude oil increases, the economics for upgrading heavy oil to a synthetic crude oil continue to improve. However, it is difficult to use a single technology for upgrading the various types of heavy oil. They have very high viscosity compared to typical liquid fuels and the viscosity changes dramatically with temperature. Vacuum distillation bottoms which flow like water at 300° to 400° C., but remain solid at room temperature are one of the most difficult refinery materials to handle and transport. These heavy oils usually come out of a refinery process in liquid form at elevated temperatures and must be introduced directly into the combustor in this form. Circulating fluidized bed boilers ("CFB") can burn refinery by-products efficiently and cleanly. The CFB process employs the circulation of fluidized particles.

Chemical looping combustion ("CLC") is another process that has received increasing attention for more than a decade. Chemical looping combustion can be used for converting hydrocarbon fuels to produce heat energy, e.g., for power generation, and from which process an essentially pure stream of $CO_2$ can be separated and recovered. Chemical looping combustion is of increasing economic interest because of the comparatively low energy loss associated with the overall operation of this process.

The CLC process is based on the principle that an oxygen carrier can serve as an intermediary to transport oxygen between atmospheric air and the fuel without direct contact of the air and the fuel. The primary advantage is the elimination of nitrogen and excess oxygen from the combustion zone and, therefore, from the combustion gases produced. A solid oxygen carrier such as a metal oxide oxidizes the fuel, which results in the production of $CO_2$ and $H_2O$. The reduced form of the oxygen carrier is then transferred to an air reactor where the reduced particles are contacted by atmospheric air and are oxidized to their initial state, and then returned to the combustion chamber or reactor(s). The overall heat of the chemical looping process is the sum of the two heat states, i.e., exothermic during oxidation of the fuel and endothermic during reduction, and the sum is equal to the heat released in a conventional combustion reaction. In the overall context of a carbon capture process, the main advantage of the chemical looping process is that minimum additional energy that is required to effect the $CO_2$ capture. The overall combustion efficiency is comparable to the conventional combustion processes, i.e., there is a minimum energy penalty for $CO_2$ capture that has been estimated to result in only a 2-3% overall efficiency loss. Moreover, NOx formation is reduced in this process, since oxidation occurs in the air reactor in the absence of fuel and at temperatures below the 1200° C. at which NOx formation increases considerably.

The CCS process has the dual advantages of both environmental and economic benefits. For example, the $CO_2$ can be used in other industrial applications after being captured. Enhanced Oil Recovery by injection of $CO_2$ ($CO_2$-EOR) into oil reservoirs to increase petroleum production is one established industrial use for $CO_2$ that has been applied commercially for about 40 years. The $CO_2$ has been derived principally from natural sources, and its feasibility has been recognized in terms of the economics of transporting of the $CO_2$ and its controlled injection into the hydrocarbon reservoir.

Patent publication US 2011/0171588 entitled Optimized Method and Device Loop Combustion on Liquid Hydrocarbon Feedstock describes an apparatus and method for $CO_2$ capture and energy production utilizing the chemical looping combustion of at least one liquid hydrocarbon feed that is mixed with an atomization gas and sprayed into contact with at least a portion of the total metal oxide particles in a riser reactor referred to as a transport zone and at a flow rate that is selected so that the superficial gas velocity of the sprayed liquid feed is greater than the transport velocity of the metal oxide particles. Thereafter, the effluents from the transport zone are introduced into a combustion zone that comprises at least one dense-phase fluidized bed where an additional quantity of metal oxide particles are reduced and combustion of the fuel is completed. The thermal cracking occurs and coke is deposited on the metal oxide particles. In some embodiments, combustion is completed in up to three separate reactors in series to burn the coke from the particles. The process described achieves the main part of the combustion of the coke deposited on the particles in the combustion reactor and the gaseous effluents of the oxidation reactor comprise a maximum of 10 percent of the total $CO_2$ produced during the overall combustion process.

It is known that various metals can be used as the oxygen carrier. Transition metal oxides such as nickel, copper, cobalt, iron and manganese are preferred because of their favorable reductive/oxidative thermodynamic properties.

The selection and design of the reactor can be important to the overall efficiencies of the CLC system. For example, in a riser reactor, e.g., a conventional FCC process of injecting liquid hydrocarbon oil in contact with solid oxide catalysts, a phenomenon referred to as back-mixing can occur which adversely affects the distribution and contact time of the co-currently moving solid and feed. When back-mixing does occur, the distribution of the catalyst/gas retention times throughout the volume of the reactor can vary widely. Additionally, the radial distribution of the catalyst concentration in the reactor is not uniform. The deviation in the speed/concentration distribution within the riser resulting from back-mixing can be especially severe when the flow rate is high, i.e., when the reactor is operated for maximum production to meet the refinery's specification.

The problems addressed by the present invention are how to further improve the overall efficiency of the chemical looping process of the prior art for the capture of an essentially pure stream of $CO_2$, including providing a simpler system with fewer components to thereby reduce the capital costs associated with the construction of the CLC unit and the day-to-day operating and maintenance expenses of the unit.

A related problem addressed is increasing the proportion of $CO_2$ recovered from the combustion step and increasing the amount of energy generated relative to the amount of oxidized oxygen carrier circulated in the system.

Another problem addressed by the present invention is how to construct and operate a CLC system that minimizes both the retention time of the oxygen carrier particles and the amount of oxygen carrier that must be circulated to achieve the required heat energy output, and also avoid the known problems of back-mixing associated with prior art reactors.

As used herein, the terms "metal oxide particles", "oxygen carrier particles", "metal oxides", "oxygen carrier" and "oxygen transfer material" are used interchangeably and include any reactive oxide components, alone or formed in combination with another material that serves as a physical carrier for the oxygen carrier that can be reversibly reduced and oxidized that are now known or that are developed in the future.

SUMMARY OF THE INVENTION

The above problems are resolved and other advantages and benefits are achieved by the process and system of the present improvements which broadly comprehends a CLC process in which oxidized particles pass by gravity feed and in a controlled flow from a storage vessel, or a hopper, into the upper end of vertically positioned downflow reactor into which downflow reactor the combustible feed is injected for reaction with some or all of the oxygen of the oxygen carrier. Additional oxygen carrying particles that are required for the complete combustion of the fuel feed are also discharged in a controlled flow from the hopper above and fall under the influence of gravity into a plurality of sequential or staged reaction zones that are positioned below the hopper. The total amount of oxygen carrier particles introduced into the three combustion zones is predetermined, based on the carbon content of the fuel, to meet the stoichiometric requirements for the complete combustion of the fuel. The hopper is supplied by recycled freshly oxidized particles that are discharged from an air reactor after their oxidation by atmospheric air.

The contact time of the raw feed with the oxygen carrier particles passing through the downflow reactor under the influence of gravity and the expansion of steam and combustion gases is relatively short as compared to prior art processes. A desirable effect of a shorter contact time is a reduction of the amount of coke formed on the particles. The potential inefficiencies associated with back-mixing are also eliminated by the use of a downflow reactor for the initial combustion step.

The remaining uncombusted feed and the fully or partially reduced particles discharged from the downflow reactor are passed to a staged fluidized bed reactor that is supplied with additional fresh oxidized particles which are gravity fed from the hopper at a controlled flow rate by one or more standpipes that terminate in the free space above the reactor bed. The introduction of oxidized particles into the reaction zone is predetermined to result in either the complete combustion of the fuel feed to $CO_2$ and water vapor, or to produce synthesis gas, or syngas, consisting of $H_2$ and CO.

Thus, in one aspect, fully oxidized solid particles of an oxygen carrier are introduced in predetermined proportions, or within a range of predetermined proportions, and mixed with a hydrocarbon fuel having known combustion characteristics at a predetermined volumetric flow rate into a downflow reaction zone, and thereafter into at least one fuel reaction zone, but preferably into a plurality of successive fuel reaction zones, the reaction zone or zones defined in part by a separation device through which the combustion products are passed and by which the partially or fully reduced solid oxygen carrier particles are retained, the reduced solid particles passing via one or more seals into an air oxidation reactor where they are oxidized, preferably to its maximum oxidation state by oxygen contained in atmospheric air passing through the air oxidation reactor. The final combustion reaction products consisting primarily of $CO_2$ and $H_2O$ are recovered as a separate stream.

The CLC process unit consists of a fuel injection system, a downflow reactor, a first stage fuel reactor, a second stage fuel reactor, a fluidized bed heat exchanger, solid oxygen carrier particle transfer lines, an air oxidation reactor, an oxidized particle collection hopper, and pressure control beds. The particle collection hopper is positioned above the upper portion of the downflow reactor and above the first and second stage reactors so that the oxidized particles are advantageously gravity fed at predetermined controlled rates, which rates can be adjusted on the fly to achieve substantially complete reduction of the oxygen carrier.

The hydrocarbon fuel is pumped to the feed injector positioned upstream of the downflow reactor and passed to a plurality of feed injection nozzles. The oxidized oxygen transfer material is delivered to the downflow reactor from a hopper and descends under the effect of gravity. As will be described in further detail below, the hopper collects the fully oxidized particles from the air reactor after the oxidation step.

After the reaction with the feed in the downflow reactor, the particles of metal oxide oxygen particles drop into the fuel reactor and the generated gas which contains $CO_2$ and $H_2O$, referred to as reacted gas, and CO, H2, CH4, C2, C3, C4, and minor amounts of other hydrocarbon gases, referred to as unreacted gas, flow to the gas collection device. The gas collection device has a smaller diameter than the fuel reactor and is lined with a heat-resistant refractory material. The gas collection device collects the reacted and unreacted gas products. Since the gas collection device is not able to separate the reacted and unreacted gas, these gases are reacted with the fully oxidized form of the metal oxide particles introduced via line in counter-current flow which enhances the contact between the metal oxide particles, unreacted gases and steam. The gas collection device serves the function of thoroughly mixing the unreacted gases in their counter-current flow contact with the freshly oxidized metal oxide particles.

The use of a downflow reactor reduces coke deposition on the oxygen transfer particles due to the relatively short residence time with the hydrocarbon gases. The gases from the downflow reactor are mixed with the product of the gasification of the coke deposits on the metal oxygen particles and the fluidization gas introduced into and rising from the bottom of the fuel reactor.

The air reactor and the downflow reactor are connected by the hopper and gas tightness is provided by the bed of oxidized solid particles in the hopper. To the extent possible, direct contact between the fuel and atmospheric air and its gaseous oxygen is to be avoided. The continuous circulation of the reactants in the present invention is maintained by controlling the pressure balance in the unit. The counter-current flow is maintained via the control of the pressure between the pressure in the hopper and the pressure in the fuel reactor which is controlled via the height of the solid particles in the respective sections. Thus, the invention reduces the number of solid handling equipment components and types. The flow of the solid particles in and through reactors is controlled by the pressure balance of the system in accordance with methods and apparatus known in the art. Pressure balance models and methods for industrial scale reactor designs have been developed and published. See, for example, Pressure Balance of a Multiple-Loop Chemical Reactor, Hadley et al., The 13$^{th}$ Int'l Conf. on Fluidization (2010), ECI Digital Archives, the disclosure of which is incorporated herein by reference.

For example, the lowest pressure in a circulating fluidized bed loop system is located in the region of the gas-solid separator where the solid particles are recovered from the gas-solid separator and passed to the downflow standpipe. Here, the pressure is essentially unchanged in the region of the gas-solid separator and the end of the standpipe. After entering, the standpipe, the solid particles are under a fluidization condition. The pressure drop along the standpipe is proportional to the bed height, and the pressure increases linearly from the bed level of the downflow standpipe to the bottom of the standpipe. Because a pressure drop needs to be overcome when the descending solid particles are transferred from the lower end of the standpipe to the upwardly flowing air reactor, the pressure decreases from the bottom of the standpipe to the bottom of the air reactor. The pressure decreases gradually in the air reactor as the particles rise from the bottom to the top. The decrease in pressure between the air reactor and the top of the hopper is produced by the pressure drop across hopper itself.

The present disclosure provides complete or improved reduction of the oxygen carrier that is not dependent on the residence time of the oxygen carrier in the fuel reactor, or an increase in the size of the fuel reactor to increase residence time.

In addition, the circulation rate of the oxygen carrier can be lowered while still achieving substantially complete reduction of the oxygen carrier particles in the downflow reactor which by design operates at a relatively high circulation rate of the solid metal oxide oxygen carrier, and in the sequential fuel reactors. This results in faster kinetics and a more energy-efficient reduction of the oxygen carrier. Thus, the present disclosure makes complete or significantly improved reduction of the oxygen carrier possible while utilizing smaller reactors, e.g., staged fuel reactors and/or the air reactor, or a lower oxygen carrier circulation rate, or both.

The method of the invention reduces the cost of the chemical looping process of the prior art by reducing the number of solid handling equipment components required, including cyclones and loop seals. The invention also eliminates or greatly reduces many of the constraints of prior art chemical looping configurations for processing liquid fuels and offers maximum flexibility for the combustion of heavy liquid hydrocarbons and vacuum residues, and coal.

BRIEF DESCRIPTION OF THE DRAWINGS

The invention will be described in further detail below and with reference to the attached drawings in which the same or similar elements are referred to by the same number, and where.

DETAILED DESCRIPTION OF PREFERRED EMBODIMENTS OF THE INVENTION

Figure 1:
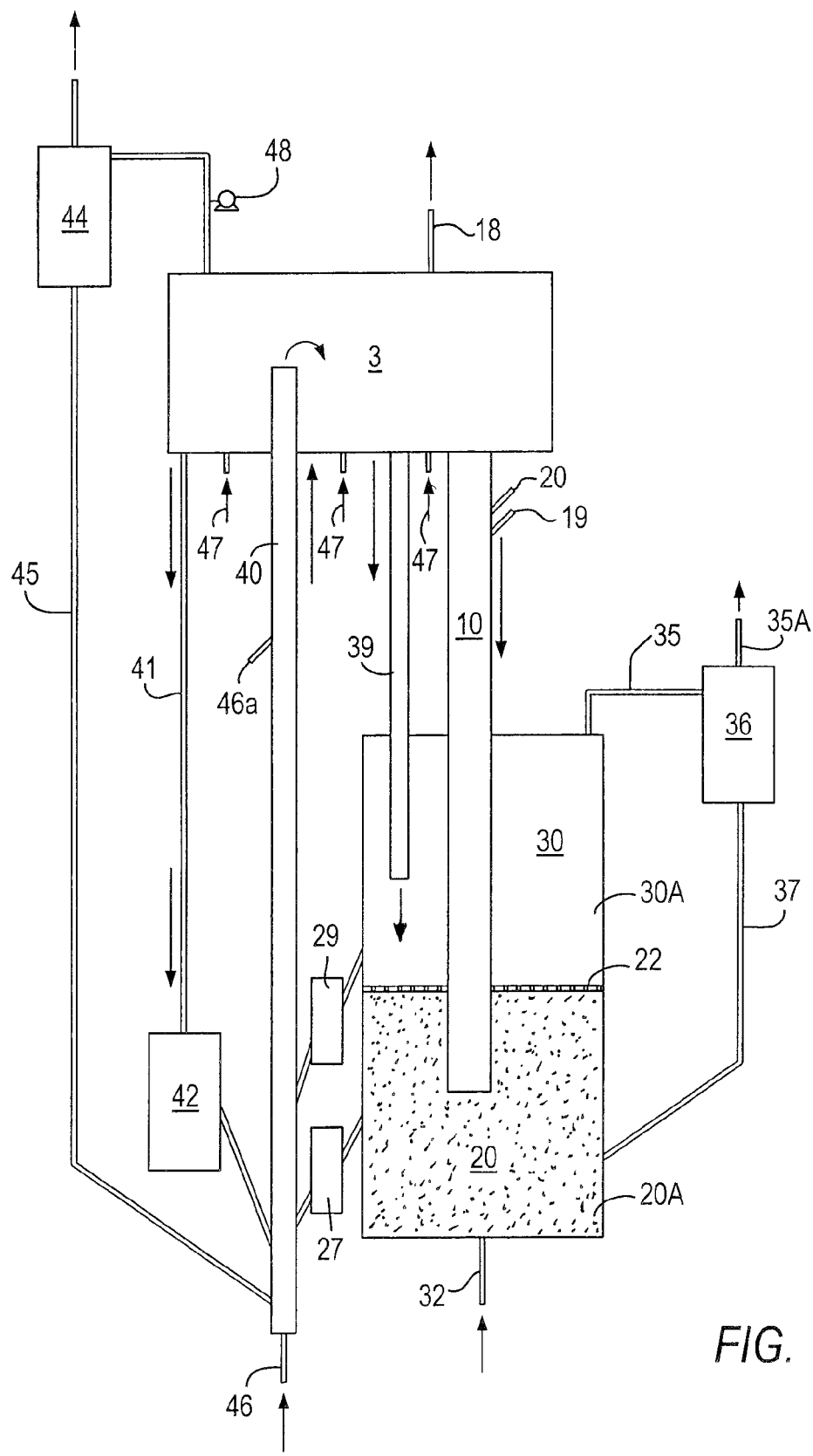
FIG. 1 is a schematic illustration of one embodiment of a CLC of the invention with two fuel reactors.

Referring to FIG. 1, there is schematically illustrated a CLC process unit (1) in accordance with an embodiment of the invention for the combustion of a heavy liquid hydrocarbon fuel. The fuel, which has been preheated, is pumped to the fuel injector (19) positioned upstream of the downflow reactor (10) and divided into equal flows by a plurality of feed nozzles where it is finely atomized and mixed in the feed nozzles with dispersing steam introduced via steam injector (20) and injected into the downflow reactor (10). Rapid vaporization of the heavy hydrocarbon fuel is thereby promoted and minimizes liquid phase coking reactions. In chemical looping combustion, the reaction takes place in the vapor phase, and maximizing vaporization of the fuel in the shortest possible time is critical to maximizing the overall efficiency of the unit operation. Large oil droplets that remain in the liquid phase can surround the metal oxide particle and effectively block the active oxidation surface area. Thus, slow vaporization of the feed is undesirable because it promotes the formation of coke.

The direction of oil injection into the flow of the metal oxides is downward in the same direction as the movement of the accelerating metal oxide particles. This injection pattern promotes the contact between feed droplets and hot oxidized metal oxides to maximize the heat transfer.

Uniform feed distribution and rapid vaporization also has other benefits. In the upper part of the downflow reactor (10) the metal oxide is directed downward by the injected steam, then the oxidized particle is stabilized by means of steam injection (20) and meets the atomized fuel/steam mist at the fuel injection point. A well distributed, rapidly vaporizing feed helps accelerate the reaction mixture to its final velocity in a smooth manner. Metal oxide particle slippage and back-mixing is undesirable because it will also promote coke deposition on the particles.

A feed injection nozzle of the prior art atomizes the liquid heavy hydrocarbon oil feed by a high energy shearing action. The injector discharges a wedge-shaped spray that fans out from the tip in a predetermined angle. The combined action of the feed nozzles provides uniform coverage of the downflow reactor's cross-section without impingement on the side walls. High velocity steam jets shear the oil further to form a fine mist or vapor.

The steam injectors are located at a predetermined distance from the bottom of hopper (3) from which metal oxide particles pass into the downflow reactor (10) at a region where great turbulence and uneven oxide particle flow patterns can occur. Therefore, a high density zone must be provided in order to absorb shocks and stabilize the solid flow. This stabilizing zone also acts as a reverse seal. If a pressure bounce were to occur, the seal will reduce the potential risk of a flow reversal. The atomization steam is from 1 to 10 weight percent and preferably from between 2 to 5 weight percent of the fuel feed, depending on the properties of the fuel.

Steam is injected in the downflow reactor (10) in order to promote a smooth and homogeneous flow of metal oxide particles at the feed injection point. The steam is introduced through a plurality of injectors (19), e.g., from 2 to 10 injectors and preferably between 2 and 6. The injectors are oriented at from 10° to 45° and preferably between 15° to 30° from the vertical axis in the downstream direction. The amount of steam is based on a reactor superficial velocity of 0.1-1.5 m/s and preferably between 0.2 and 1.2 m/s.

The fuel injectors (19) are located below the stabilization steam injectors (20). The injectors' angle is between 15° and 60°, and preferably between 25° and 45° from the vertical and are oriented downwardly. The feed injector's projection point on the axis of the downflow reactor (10) should be higher than that of the stabilization steam injectors (20). For good feed distribution in the downflow reactor, the number of injectors should be as high as possible, taking into account the constraints of the physical size of the apparatus.

The atomized fuel droplets contact the hot oxidized metal oxide particles and are vaporized. The vaporized oil intimately mixes with the metal oxide particles which crack the gas phase fuel and the product gas reacts with the oxygen of the metal oxides which are thereby reduced. The products of the reaction, $CO_2$, $H_2O$, and other unreacted gases, travel down the downflow reactor (10) while carrying the metal oxides.

At the exit of the downflow reactor (10), the metal oxide particles fall by gravity into the first fluidized fuel reactor (20) that is operated in a turbulent fluidization regime. The metal oxide particles are separated from the gas by gravity in the freeboard region, i.e., above the surface of the moving particles in the first fluidized bed reactor. The separated particles can contain entrained unreacted hydrocarbon gases. The combustion of the unreacted gas will be completed in the fluidized bed of metal oxide particles which is fluidized by steam line (32) introduced via conventional fluidizing rings and the like and is preferably operated in the dense or turbulent regime. The first fluidized fuel reactor (20) is operated in the turbulent regime in order to promote good mixing and metal oxide particle distribution in this reactor to enhance coke gasification to form CO and $H_2$, which then reacts with the metal oxide. Coke deposition can occur in the downflow reactor (10). The coked metal oxide particles in the presence of steam in the fluidized bed are gasified and the product gases and CO, $H_2$ further react with the oxygen carrier particles to produce additional heat, $CO_2$ and $H_2O$.

In the first fluidized fuel reactor of the present invention, the coke on the metal oxide particles is gasified at a temperature between 850° C. and 1200° C., and preferably between 950° C. and 1100° C. The products of the gasification will react with the unreduced or partially reduced metal oxide particles. The residence time of the particles in the first fluidized fuel reactor (20) is from between 1 to 15 minutes, and preferably between 3 to 10 minutes.

The design diameter of first fuel reactor (20) is determined based on gas superficial velocities. For good fluidization gas distribution and uniform mixing of metal oxide particles in the bottom section (20A), the velocity can be in the range of from between 0.3 to 1.25 m/s and preferably from between 0.5 to 0.75 m/s. In the disengaging zone where more gas is present than solid oxide particles, the velocity should not exceed about 0.75 m/s in order to minimize particle transport out of the first fuel reactor (20). Baffles and the selection of specific packing shapes and sizes can be used to inhibit by-passing and the tendency to mix vertically in the fluidized beds. For example, within a defined range of gas velocities, baffles are used to control, break up and renew the gas bubbles and thereby substantially improve the gas-solid contact and uniform fluidization through the bed. This especially important when the CLC process is operated in a large diameter column with a deep bed to avoid or minimize vertical flow channels and other disparities through the bed.

The fluidization medium introduced into the bottom of the bed via the fluidizing line (32) can be steam or a mixture of steam and $CO_2$. The product of the reaction in first fuel reactor (20) will join the unreacted and reacted gases coming from the downflow reactor (10).

A bed of metal oxide particles is disposed on, and supported by a perforated plate (22) extending horizontally in the lower portion of second fluidized fuel reactor (30). The bed can consist of discrete particles of metal oxide material which are introduced into the second fuel reactor (30) by a standpipe (39), or in any other known manner. For example, the standpipe (39) extends from hopper (3) and the flow can be controlled by a programmed processor/controller operatively connected to a variable speed motor that powers a screw conveyor to introduce the particles into the standpipe (39) where they fall under the effect of gravity.

It is to be understood that a sulfur-adsorbing material, such as limestone, can also be introduced at a controlled rate into the second fuel reactor (30) in a similar manner, e.g., via standpipe from an exterior storage vessel (not shown) in order to adsorb the sulfur generated by the burning of sulfur-containing fuels such as coal.

The perforated plate (22) permits the combustion gases produced in the first fuel reactor (20) and the downflow reactor (10) to pass into the second fuel reactor (30) which is another staged fuel reactor where the combustion of the unreacted gases from the downflow reactor (10), and steam and $CO_2$ from reactor (20) can react with the metal oxide particles present. The reduced oxide particles are retained in first reactor (20) by the perforated plate (22) and withdrawn via a loop seal (27) for transfer to the bottom of air reactor (40). Thus, plate (22) serves to separate the two staged reactor beds (20, 30) and essentially prevent co-mingling of the reduced oxide particles of one with the other. Some passage of particle fines may occur due to their attrition by fluidization.

The steam (32) injected in reactor (20) and from the downflow reactor (10) is used for the fluidization of the particle bed in reactor (30). There is no need to introduce any additional fluidization medium to maintain the stable operation of reactor (30), since the necessary volume of fluidization gas is provided by the $CO_2$ and $H_2O$ reaction products of reactor (20) and the downflow reactor (10). As a result, the capital and operational costs associated with fluidizing steam generation are reduced.

The design diameter and other parameters of the second fuel reactor (30) are determined based on superficial gas velocities. For good fluidization gas distribution and good metal oxide particle mixing, a velocity in the bottom section (30A) is of from 0.15 m/s to 0.8 m/s, and preferably from 0.5 to 0.75 m/s. In the disengaging section, the velocity should not exceed 0.75 m/s in order to minimize the transport of metal oxide from the second reactor.

The following factors and design parameters relate to the fluidization of the beds. The entire surface area to be fluidized is divided into a plurality of sections each of which are of the same surface area. Each section is sprayed by one fluidizing jet that corresponds to a nozzle on a ring. The fluidizing gas discharged from the outlet of the nozzle maintains its initial orientation for a given penetration and then flows upwardly vertically in the direction as it is dispersed. The jet density is chosen based on the ring surface area between 15 jets/m2 and 45 jets/m2, and preferably between 20 and 40 jets/m2.

Nozzles with orifices are preferably used for fluidization because the gas distribution requires a significant pressure drop through the nozzles without exceeding the maximum nozzle outlet velocity. The orifice provides a pressure drop of from about 0.1 to 0.4 bar, and preferably from 0.15-0.3 bar. The nozzle orifice is chosen to provide a maximum outlet velocity of from between 20-60 m/s and preferably between 45-55 m/s. All nozzles preferably have the same diameter and consequently the gas is evenly distributed, and the flowrate through each nozzle corresponds to the total flowrate divided by the total number of nozzles. Exceeding the limits of nozzle outlet velocities will result in the more rapid attrition of the solid particles.

The hot flue gases exiting from the second fuel reactor (30) via the flue line (35) can entrain a portion of the relatively smaller particulate material and are passed into the separation zone (36) which can include a cyclone, U-beam or other separator that functions in the conventional manner to separate the entrained particulate material from the combustion gases which are discharged via flue (35A). The fine particles separated will then be passed via transport conduit (37) and recirculated to the fuel reactor (20).

It will be understood by those of ordinary skill in the art that appropriate conventional ducting and gas/solid separation devices, e.g., cyclones and U-beam separator systems (not shown), are provided to prevent metal oxide particles and their fines from passing from first fuel reactor (20) to the second reactor (30).

The reduced metal oxide flows from the fuel reactor (20) through a lateral conduit into the reduced metal oxide bed holder seal (27) which is maintained as a quiescent bed at a predetermined proper standpipe density by introduction of a controlled flow of fluidizing steam from the reduced metal oxide bed holder ring manifold in accordance with methods known to the art (not shown).

A stable flow of metal oxide down the standpipe is provided by injection of steam at several elevations on the standpipe to eventually form a uniform fluidization state of the solid particles and gases. As the head pressure increases down the standpipe and the metal oxide flow is compressed, the steam injection points effectively replace the "lost" volume to thereby ensure a continuity of fluid-like flow of the reduced metal oxide particles.

At the bottom of the reduced metal oxide particle standpipe (39), the reduced metal oxide bed holder loop seal (29) advantageously controls the bed's gas tightness before the reduced particles are passed to the air reactor (40). The reduced metal oxide bed holder also functions to maintain a stable operational flow between the second fuel reactor (20) and the air reactor (40).

The bed holder loop is provided to prevent gas leakage between the air reactor and the fuel reactor. In the present invention, the bed holder loop seal avoids mixing of $CO_2$ produced in the fuel reactor with nitrogen present in the air flow in the air reactor which is eventually discharged into the atmosphere. This is another advantage of the method of the invention since the gas tightness or seal between the air reactor (40) and the fuel reactor(s) (20, 30) is provided by the metal oxide particle bed in the hopper (3). Combustion gases comprising either $H_2O$ and $CO_2$ or CO and $H_2$ are discharged from hopper (3) via a gas flue (18).

The reduced metal oxide particles pass to the base of the air reactor (40) where they are fluidized by a first air ring. The base of the air reactor operates in the turbulent fluidization regime in order to achieve a thorough mixing of the atmospheric air and the entering reduced metal oxide particles. The fluidization outlets in the air reactor base section ensure that the flow of metal oxide particles to the second air injection point (46a) is stable. The particles of metal oxide are transported to the second air injection position where the injection of secondary air divides the exothermal reaction and provides a means for controlling the temperature profile in the air reactor. The oxidation of the reduced metal oxides is completed and the exothermal reaction of the oxidation of the reduced metal oxides and therefore the amount of heat released is optimal.

The metal oxide particles in the presence of the air are oxidized and transported at a rate that is sufficient to lift them up to the hopper (3) where they are discharged in a fully oxidized state. During the movement of the particles between the reactors, they are subjected to attrition and/or fragmentation, and therefore the particles discharged into the hopper include a distribution of size. Smaller particles, e.g., less than 50 microns, can be transported by the gas and are recovered by the cyclone (44) and transported back the bottom of the air reactor (40) via the standpipe (45). It is important to have this loop in order to reduce the loss of particles from the system with the gases discharged from the air reactor (40).

Thus, the smaller particles are recirculated to the base of the air reactor (40) via a separation section consisting of a cyclone (44) where particles are separated from the gas, and the particles are passed to recycle standpipe (45) and descend by gravity to the base of the air reactor (40). The metal oxide particles can also be recirculated from the hopper (3) to the bottom of the air reactor (40) via standpipe (41) and a loop seal (42) in order to assure complete oxidation of the reduced metal oxides.

Loop seals can be used to control the necessary pressure differentials in a solid circulation loop system so that particles can flow from a zone of low pressure such as a cyclone to a high pressure zone, e.g., a furnace or a riser reactor, without undesirable inverse gas flow. Loop seals are extensively used in fluidized bed systems. A typical loop seal includes three main components: a supply chamber, a recycle chamber, and a recycle pipe. Different configurations exist for loop-seals based on the connection of supply chamber and recycle pipe and include the use of a simple slit opening between the chambers or a horizontal pipe connection between two sections. Loop seals usually have a horizontal pipe unless they are specifically designed to have no external wall between these two chambers. In some industrial high solid flow units, two recycle pipes are used to increase the maximum solid flow rate in the loop seal. This technology is called twin-exit loop seal.

Figure 3:
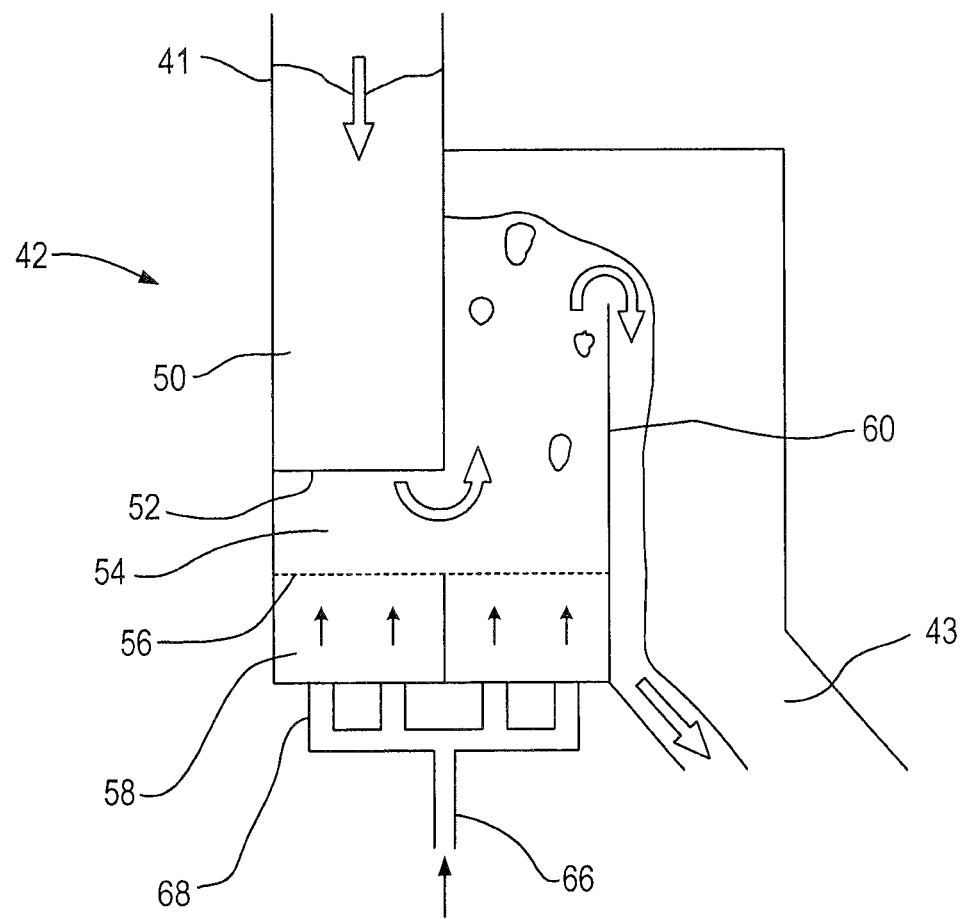
FIG. 3 is a schematic illustration of a prior art loop seal representative of a type of seal suitable for use in the practice of the CPC process of the invention.

Referring to FIG. 3, there is schematically illustrated a seal (42) of a general type that is suitable for use in the practice of the CLC process in accordance with the present disclosure. The loop seal (42) is shown generally in the system of FIG. 1, where downflow recycle pipe (41) introduces the solid oxide particles under the force of gravity into a supply chamber (50) having a lower opening (52) that is in communication with the recycle chamber (54) defined by a weir (60) extending between the opposing walls of the seal housing. As will be understood by one of ordinary skill in the art, the height of the weir determines, in part, the pressure in the recycle pipe (43) into which the solid oxide particles flow after passing over the weir (60). A manifold (66) having a plurality of distributed nozzles (68) in fluid communication with one or more air boxes (58) introduce a fluidizing gas flow through the fluidizing grid (56) upon which the metal oxide particles in the recycle chamber (54) are supported. The flow and pressure of the fluidizing air entering manifold (66) is also responsible for the pressure drop across seal (42).

One modification of the loop seal which can be used to advantage in the CLC system of the present disclosure is the installation of a heat exchanger inside the loop seal. This arrangement permits heat to be recovered from the hot particles which can be used elsewhere in the system, e.g., to preheat the liquid fuel and/or new metal oxide particles before they are added to replace materials lost to attrition.

Particles flow through a standpipe into the supply chamber and then into the recycle chamber. Solids are in a fluidized state in the recycle chamber and overflow through a horizontal passage or weir into the recycle pipe where they are conveyed to a subsequent unit in the system which could be a riser or a reactor.

In order to monitor and control the operation of the process, automatic sampling and analysis of the gas stream exiting the air reactor after separation from the oxidized particles by a sampling device (48) can be performed to determine whether oxidation is complete. In an embodiment, the oxidation state of the particles can be determined indirectly or inferred by analysis of the oxygen content in the gases exiting the air reactor (40). The lower the concentration of oxygen in the oxygen-depleted air, the higher the oxidation state of the metal oxide particles.

The oxidized metal oxide particles recovered in the hopper (3) can be discharged to the freeboard of reactor (30) via standpipe (39) for reaction with the unreacted gases. In addition, the circulation rate of the oxygen carrier can be reduced while still achieving substantially complete reduction of the oxygen carrier in the first and second fuel reactors and in the down flow reactor, which in the prior art design and operation, relied on a relatively greater circulation rate of the solid metal oxide oxygen carrier to achieve substantially complete reduction of the oxygen carrier, by utilizing fuel reactor(s) and/or air reactor, and/or by lowering the oxygen carrier circulation rate.

As previously noted, the increase of the gas volume due to the reaction increases the velocity of gas in the fuel reactors. The increase of the velocity of the gas stream can result in entrainment of metal oxide particles which are carried out of the reactor by the gas stream. A separation device, such as one or more cyclones, can be used to recover the particles and return them to the fuel reactor.

Figure 2:
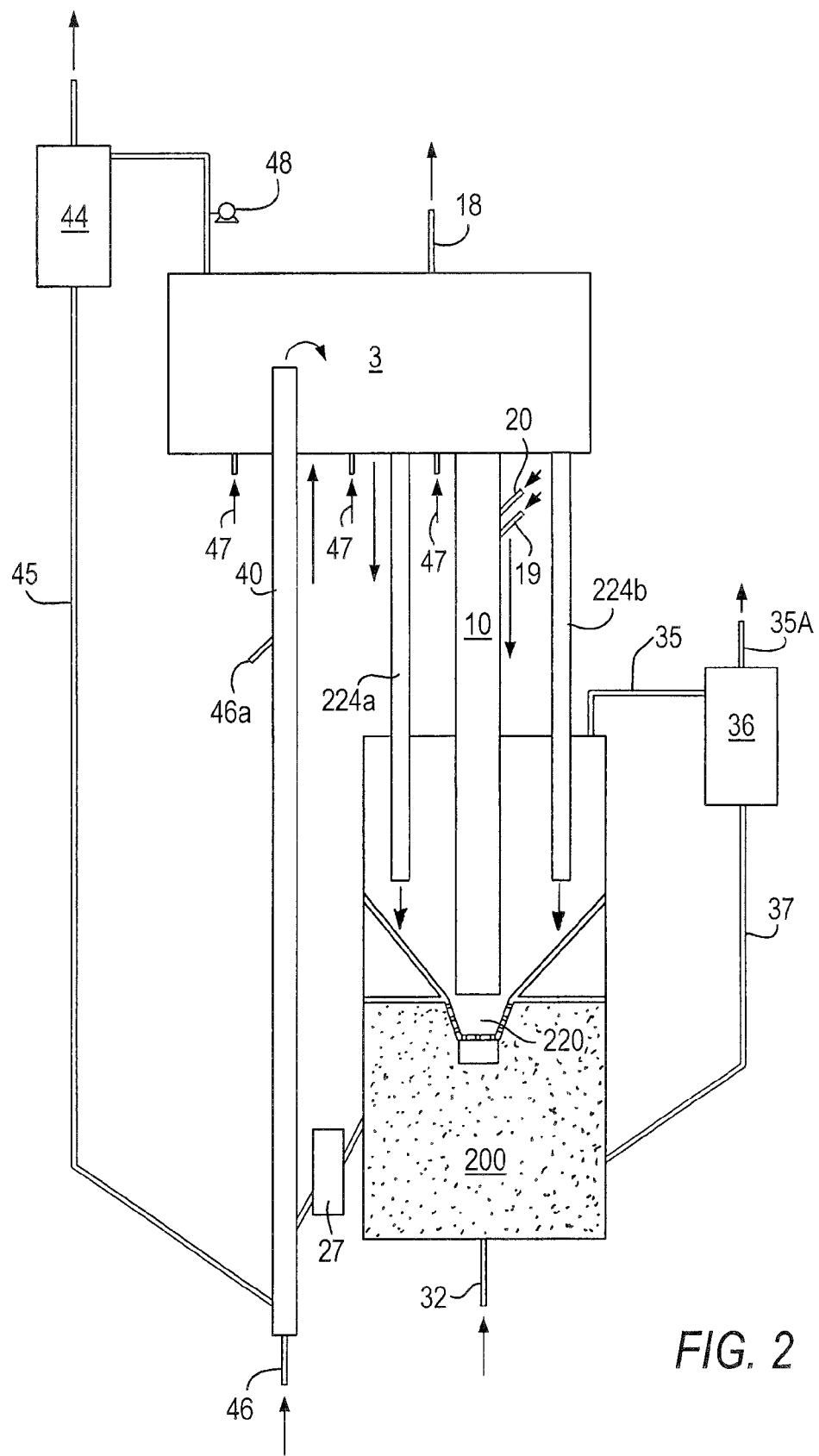
FIG. 2 is a schematic illustration of another embodiment of a CLC of the invention with a single reactor.

Referring now to FIG. 2, another embodiment (100) of the CLC process of the present invention is schematically illustrated in which the reduction of the metal oxide particles occurs in a single reactor (200). The geometry and the design of fluidized fuel reactor (200) is dimensioned and configured to insure full conversion of the liquid fuel introduced from the downflow reactor (10). As in the embodiment of FIG. 1, the oxidized metal oxide particles from the hopper (3) drop into the downflow reactor (10) where the liquid fuel is injected, vaporized and reacts upon contact with between 5 and 30 percent of the metal oxides, and preferably with between 8 and 15 percent, of the total metal oxides stoichiometrically determined as needed to complete combustion of the entire volume of the hydrocarbon fuel injected.

Unreacted gases at the exit of the downflow reactor (10) are passed to the intake of a gas collection device (220) located at an intermediate position (200A) in the fuel reactor (200). The reduced metal oxides from the downflow reactor (10) which may contains small amounts of coke drop to the bottom of fuel reactor (200) where they are fluidized and gasified by steam injection using conventional fluidization apparatus, such as rings, bubble cups, or one or more perforated plates as described above in conjunction with FIG. 1. The remaining amount of the metal oxide particles needed for the complete stoichiometric conversion of the total amount of liquid fuel injected into the downflow reactor (10) is introduced via two standpipes (224A) and (224B), taking into account the oxygen carrier particles introduced via downflow reactor (10), by adjusting the pressure balance of the system in accordance with methods well known in the art, e.g., by changing the flow rates of solid particles and/or the gases in the system. As previously described, the amount and rate of introduction of the oxidized particles from the hopper (3) into each of the CLC system reactors can be controlled by a programmed processor/controller that also receives data in real time indicating the flow rate by volume or weight of liquid or solid fuel feed into the downflow reactor and the predetermined analysis of the carbon content on a molar or other convenient basis.

The oxidized metal oxide particles from the standpipes (224A) and (224B) are introduced into the upper portion of the gas collector (220) in counter-current flow to the gas in order to insure thorough mixing of the gases and the particles of metal oxide. After the reduction reaction, the reduced metal oxides in the fuel reactor (200) are passed to the air reactor (40) via a loop seal (27). The heat of oxidation resulting from the reduction of the metal oxides is retained by the metal oxide particles which will later supply the required heat to the downflow reactor (10) and the fuel reactors (200).

The mass and heat balances of the CLC unit process of the invention are much more flexible than in the single-stage metal oxide reduction in liquid fuel systems of the prior art because the reaction is divided between two different zones. The liquid fuel vaporization and coke gasification and the unreacted gas reactions are controlled separately. The coke combustion reaction is insured in the first stage reactor of the fluidized fuel reactor, while complete conversion of the unreacted fuel is accomplished in the second stage reaction zone.

In accordance with an embodiment, the amount, or relative proportion of heavy liquid fuel at the two locations can be varied to generate different ratios of hydrogen-to-carbon monoxide when syngas is the desired end product. Controlling the amount or the relative proportion of heavy fuel relative to the amount of the oxygen as provided by the oxidized solid particles can be used to increase the ratio of hydrogen-to-carbon monoxide when syngas is the desired product. Increasing the amount of heavy liquid fuel relative to the amount of oxygen present in the system, results in partial combustion to produce H2 and CO instead of $CO_2$ and $H_2$. When the feed injection is staged, i.e., injection at different locations and at the level where the oxygen carrier can be reduced to give an oxygen carrier partially oxidized, the probability that the reduced form of the oxygen carrier will be in contact with the feed injected at the level of the second injection point is high. The contact between the partially oxidized form of the oxygen carrier and the feed will lead to the production of syngas, $H_2$ and CO.

It is well known that the kinetics of hydrogen reactions are faster than those of carbon monoxide or light hydrocarbon gases in reducing a metal oxide to metal in a chemical looping combustion process. Light hydrocarbon gases are defined as those having one to four carbon atoms, and olefins having two or more carbon atoms.

The configuration of the system of the present embodiments provides an improvement over simply introducing the fuel into the fuel reactor and/or into a transporting zone, since it can be controlled to achieve complete or substantially complete reduction of the oxygen carrier that is not limited by the residence time of the oxygen carrier in the fuel reactor, and does not require an increase in the size of the fuel reactor in order to increase residence time. Instead, the result is achieved by controlling the flow rates of the oxygen carrier material by controlling the internal pressure balance of the system.

The present invention also reduces the number of components in the solid handling system, such as cyclones and loop seals, because solid circulation and gas leakage between the air reactor and fuel reactor is accomplished via the hopper (3) that is fluidized with steam introduced into the lower region of the hopper, e.g., via a plurality of hopper fluidizing steam lines (47) that are in communication with interior distribution manifolds and related nozzles comparable to those described above.

The difference between the system embodiments illustrated by FIGS. 1 and 2 is the connection between the two fuel reactors (20, 30). In the first embodiment, first fluidized fuel reactor (20) and second fluidized fuel reactor (30) are connected via a perforated plate (22) by which the two zones are separated. The unreacted gas from the first fuel reactor (20) has to pass through the perforated plate (22) to react with the metal oxide particles in the second reactor (30).

With continuing reference to the second embodiment as illustrated in FIG. 2, fuel reactor (200) via the conduit (220). The metal oxides in their fully oxidized state are passed from the hopper (3) to reactor (200) via a plurality of standpipes (224A) and (224B) for reaction with the unreacted gases coming from the reactor (200) and from the downflow reactor (10). In the embodiment of FIG. 2, there is no need for the perforated plate (22) described in the first embodiment. The principal difference between the two embodiments is that the unreacted gas from the downflow (10) and first fluidized reactor (20, 200) contact the metal oxide oxygen carrier. In the first embodiment, the mode of contact between the unreacted gases is in concurrent flow; in the second embodiment, the unreacted gases and metal oxide particles move in counter-current flow.

EXAMPLE

The following example describes the operation of the system illustrated in FIG. 1. The particulate oxygen carrier (OC) is nickel oxide on a nickel/alumina support having a density of 2725 kg/m3 and an oxygen transport capacity RO of about 10.9 wt percent, but only about 13.6 percent of the oxygen participates in the reaction, yielding an actual oxygen transport capacity of about 1.5 wt percent which is calculated as follows:

$$\text{RO wt \%} \times \text{Wt of OC} = \text{Available } O_2 \quad (1)$$

The composition of the liquid hydrocarbon heavy fuel oil (HFO) that is introduced in the down flow reactor (10) is as follows:

| Composition | Wt % |
|---|---|
| C | 82.7 |
| H | 10 |
| N | 0.6 |
| S | 5.7 |
| O | 1 |

The HFO has the following characteristics:
Density@25° C.=1019.9 kg/m3
Pour point=+15° C.
Softening point<30° C.
HHV=40,925 MJ/kg
LHV=38,775 MJ/kg The feed is injected at 6.126 kg/s. The nickel oxide required to provide the needed oxygen for the complete combustion of the injected fuel is 984.6 kg/s. The flow of metal oxide is divided into three portions, a first portion 98.5 kg/s is transferred from the hopper (3) to the downflow reactor (10) and then recovered in the first fuel reactor (20). All of the fuel is introduced into the system via the downflow reactor (10), the temperature of which is about 1000° C. and the residence time is from about 2 to 4 seconds. The composition of the flue gas at the exit of the downflow reactor (10) is estimated to be composed of from 25-30% $CO_2$, 4% CO, approximately 3% $H_2$, 8-10% CH4 and from 49-60% of C2-C9 compounds.

The reduced metal oxides are a mixture comprising 68.7 kg/s of NiO/NiAl2O4 and 27.8 kg/s of Ni/NiAl2O4. The metal oxide particles are separated from the unconverted gases by gravity. The metal oxide particles descend under gravity to the reactor (20) where they are fluidized, e.g., by steam introduced via conduit (32) and transported to the air reactor (40). No $CO_2$ is passed to the air reactor (40), since the residence time of between 250 and 380 seconds in fuel reactor (20) guarantees the conversion of any coke present on the metal oxide particles. The unconverted gases flow up through reactor (30) and react with fresh or regenerated metal oxide particles.

The flow of 886.1 kg/s of metal oxide particles from the hopper (3) to the reactor (30) assures the full conversion of gases. The residence time in the reactor (30) is between 380 to 600 seconds. The temperature of reactor (30) is about 1000° C. and is achieved by the circulation of the hot oxidized metal oxide particles from the hopper (3).

At the exit of reactor (30), the particles comprise a mixture of 618.8 kg/s NiO/NiAl2O4 and 250.26 kg/s Ni/NiAl2O4.

The composition of the mixture of metal oxide particles entering the air reactor (40) is 687.59 kg/s of NiO/NiAl2O4 and 278.07 kg/s of Ni/Al2O4. The inlet temperature of the metal oxide particles is 869° C. after heat exchange in a fluidized bed heat exchanger (not shown) located between the air reactor (40) and the fuel reactor where 125 MW of energy is recovered from the solid-gas exchange.

At the exit of the air reactor (40), the temperature of the exiting gas is 1060° C. and 89.4 MW are recovered. From the hot gas at the exit of the fuel reactor (30), 44.01 MW are recovered. The total energy recovered from the system is calculated to 258.41 MW. The efficiency of the energy recovery from the fluidized bed heat exchanger is about 48%.

The $CO_2$ capture rate is increased from between 2 and 4 percent, as compared to existing liquid chemical looping combustion systems because the production and retention of coke on metal oxide particles is minimized. The $CO_2$ capture efficiency was calculated to be between 94% to 96%, based on the above test. The balance constitutes the percentage of carbon content that escapes from the fuel reactors to the air reactor to reduce the amount of total $CO_2$ captured.

Introducing the predetermined stoichiometrically required quantities of oxygen carrier material by controlled gravity feed into each of three different combustion zones for the staged sequential combustion of the vaporized fuel and unreacted gases provides control of the combustion/reaction process. Splitting the combustion of the fuel and its unreacted by-product gases between three reaction zones in the down flow reactor (10), first fuel reactor (20) and second fuel reactor (30) results in complete or near complete combustion of the hydrocarbon fuel which in turn increases the rate of $CO_2$ capture. The system and method of the invention reduces the required number of ancillary equipment components such as cyclones and loop seals, avoids $CO_2$ leakage from the fuel reaction zone into the air reactor, and improves the overall efficiency of the CLC process.

The chemical looping process according to the invention eliminates or greatly reduces the constraints of CLC processes and systems of the prior art for both liquid and solid fuels and offers maximum flexibility of injecting different types of fuels including gases, liquid and solid fuels, and specifically the combustion of heavy liquid hydrocarbon fuels such as vacuum residues, and of coal.

The invention claimed is:

1. A chemical looping combustion process for the recovery of $CO_2$ comprising:
    a. atomizing a preheated hydrocarbon feed, wherein the preheated hydrocarbon feed is intimately mixed with dispersing steam in a mixing zone and introduced into the upper portion of a downflow reactor;
    b. contacting the atomized hydrocarbon feed and steam mixture with a predetermined amount of hot oxidized particles of metal oxide which are introduced by gravity feed into the upper portion of the downflow reactor, wherein the hydrocarbon feed is vaporized and reacts with the metal oxides, thereby reducing the oxidation state of the metal oxides to produce reaction products comprising $CO_2$ and $H_2O$, and reduced metal oxide particles containing coke;
    c. passing the reaction products and reduced metal oxides from the downflow reactor to a first fluidized fuel reactor containing fresh oxidized particles, wherein coke formed on the particles of metal oxide is gasified, resulting in gasification products comprising CO and $H_2$ which further react with the metal oxides;
    d. passing the reaction products comprising $CO_2$, $H_2O$ and unreacted gases and any unreacted fuel from the downflow reactor and first fluidized fuel reactor through a perforated plate that is dimensioned and configured to retain the metal oxide particles, and into a second fluidized fuel reactor containing fresh particles of oxidized metal oxide in which any unreacted gases are reacted;
    e. passing gaseous reaction products and any entrained particulate matter from the second fluidized fuel reactor to a separation device in which the gaseous reaction products are separated from the particulate matter and recovered as a product stream and the particulate matter is recycled to the first fluidized fuel reactor;
    f. passing the particles of reduced metal oxide from the first and second fluidized fuel reactors to separate bed holder loop seals from which the particles of reduced metal oxide are passed to an air reactor and into contact with a moving stream of an oxygen-containing gas to oxidize the reduced metal;
    g. passing particles of freshly oxidized metal oxide from the air reactor to a hopper from which the metal oxides are gravity fed at predetermined controlled rates to each of:
        i. the downflow reactor of step (a);
        ii. the first fluidized fuel reactor of step (c);
        iii. the second fluidized fuel reactor of step (e); and
        iv. optionally, to an intake of the air reactor via a separation device which separates any gas from the metal oxide; and
    h. recovering a stream of substantially pure $CO_2$.

2. The method of claim 1 in which the metal oxide particles in the hopper are maintained in a fluidized state.

3. The method of claim 1 in which the rate of passage of the oxidized metal particles into each of the (a) downflow reactor, (b) first fuel reactor and (c) second fuel reactor is controlled by a preprogrammed microprocessor/controller operatively connected to particle feeding devices each of which devices are in communication with the upper portion of the downflow reactor and standpipes to the first and second fuel reactors, respectively.

4. The method of claim 1 in which the separation device at the discharge end of the air reactor is a cyclone separator.

5. A chemical looping combustion process comprising:
    a. atomizing and mixing a preheated hydrocarbon feed with dispersing steam and introducing into the mixture into the upper portion of a downflow reactor;
    b. contacting the atomized hydrocarbon feed and steam mixture with hot particles of metal oxide in the upper portion of the downflow reactor, wherein the hydrocarbon feed is vaporized and reacts with the metal oxides, thereby reducing the oxidation state of the metal oxide particles and producing reaction products comprising $CO_2$ and $H_2O$, and particles of reduced metal oxides;
    c. passing the reaction products and reduced metal oxide particles from the downflow reactor to a fluidized fuel reactor, wherein any unreacted hydrocarbon gases are collected in a gas collector at the exit of the downflow reactor and the remaining reaction products and particles of metal oxides are passed to the lower portion of the fuel reactor, where any coke formed on the metal oxide is gasified;
    d. contacting the collected unreacted gases with particles of oxidized metal oxides which are passed in countercurrent flow with the collected gas, thereby producing additional $CO_2$ and $H_2O$;
    e. passing reaction gases from the fluidized fuel reactor to a separation device, where any particles entrained in the reaction products are separated from the reaction products and the particles are recycled to the fluidized fuel reactor;
    f. recovering the reaction products as a product stream;
    g. passing the reduced metal oxide particles from the fluidized reactor to a bed holder loop seal from which the particles of reduced metal oxides are passed to an air reactor to oxidize the reduced metal oxides;

h. passing particles of freshly oxidized metal oxide from the air reactor to a hopper from which the metal oxides are gravity fed at predetermined controlled rates to each of:
  i. the downflow reactor of step (a);
  ii. the first fluidized fuel reactor of step (c);
  iii. the second fluidized fuel reactor of step (e); and
  iv. optionally, to an intake of the air reactor via a separation device which separates any gas from the metal oxide.

6. A chemical looping combustion reactor system comprising:
  a downflow reactor having means for receiving and contacting an atomized hydrocarbon feedstream with hot oxidized metal oxide particles passed from a fluidized hopper;
  a first fluidized fuel reactor positioned to receive fresh hot oxidized metal oxide particles from the hopper, the first reactor in fluid communication with the downflow reactor for receiving the downflow reactor reaction products and in fluid communication with a separating device for receiving separated particles of metal oxide;
  a perforated plate separating the first fluidized fuel reactor from a second fluidized fuel reactor, the perforated plate being configured and dimensioned to prevent the passage of particles of metal oxide and to pass reaction products from the first fluidized fuel reactor to the second fluidized fuel reactor;
  the second fluidized fuel reactor having means for receiving the particles of oxidized metal oxide from the hopper and contacting the particles of metal oxide with reaction products from the first fluidized fuel reactor;
  the separating device being in fluid communication with the second fluidized fuel reactor and configured and dimensioned to receive and separate the reaction products from any entrained particulate material;
  a first bed holder seal in fluid communication with the first fuel reactor adapted to receive the particles of reduced metal oxide particles from the first fuel reactor and a second bed holder seal in fluid communication with the second fuel reactor adapted to receive the particles of reduced metal oxide particles from the second reactor, the first and second bed holder seals operatively connected to the intake of an air reactor adapted to oxidize the reduced metal oxide particles and discharge the oxidized particles into the hopper; and
  passing particles of freshly oxidized metal oxide from the air reactor to a hopper from which the metal oxides are gravity fed at predetermined controlled rates to each of:
    i. the downflow reactor of step (a);
    ii. the first fluidized fuel reactor of step (c);
    iii. the second fluidized fuel reactor of step (e); and
    iv. optionally, to an intake of the air reactor via a separation device which separates any gas from the metal oxide.

7. A chemical looping combustion reactor system comprising:
  a downflow reactor having means for receiving and contacting an atomized hydrocarbon feedstream with metal oxide particles;
  a fluidized fuel reactor in fluid communication with the downflow reactor for receiving the downflow reactor reaction products, the fuel reactor including a gas collection device for collecting unreacted gas from the downflow reactor;
  a separating device in fluid communication with the fluidized fuel reactor for receiving the reaction products and separating any entrained particles from the reaction products;
  the fluidized fuel reactor in fluid communication with the separating device for receiving the separated particles; and
  a first bed holder seal in fluid communication with the fuel reactor for receiving reduced metal oxide particles from the fuel reactor.

* * * * *